(12) United States Patent
Seto

(10) Patent No.: US 8,059,183 B2
(45) Date of Patent: Nov. 15, 2011

(54) IMAGE SENSING APPARATUS AND METHOD FOR CONTROLLING THE SAME

(75) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 12/266,926

(22) Filed: Nov. 7, 2008

(65) Prior Publication Data

US 2009/0128663 A1 May 21, 2009

(30) Foreign Application Priority Data

Nov. 16, 2007 (JP) ................................. 2007-298589
Oct. 30, 2008 (JP) ................................. 2008-280278

(51) Int. Cl.
*H04N 5/222* (2006.01)

(52) U.S. Cl. .................... 348/333.04; 348/135; 348/188; 348/346; 348/333.03

(58) Field of Classification Search .................. 348/135, 348/136, 137, 140, 176, 188, 345, 346, 349, 348/187, 333.01, 333.02, 333.03, 333.04
See application file for complete search history.

(56) References Cited

U.S. PATENT DOCUMENTS

| | | | | |
|---|---|---|---|---|
| 5,668,596 | A * | 9/1997 | Vogel ......................... | 348/222.1 |
| 6,034,721 | A * | 3/2000 | Mangeat et al. ............... | 348/97 |
| 7,519,285 | B2 * | 4/2009 | Ishii .............................. | 396/102 |
| 2002/0171746 | A1 * | 11/2002 | Stephany et al. ............. | 348/239 |
| 2003/0179310 | A1 * | 9/2003 | Irie ............................... | 348/349 |
| 2005/0063585 | A1 | 3/2005 | Matsuura ...................... | 382/162 |
| 2007/0126921 | A1 * | 6/2007 | Gallagher et al. ............ | 348/362 |
| 2008/0304741 | A1 * | 12/2008 | Brunner et al. ................ | 382/168 |

FOREIGN PATENT DOCUMENTS

JP   2004-153684   5/2004

OTHER PUBLICATIONS

Chinese Office Action dated Jun. 17, 2010, in Chinese Application No. 200810167397.8, and English-language translation thereof.

* cited by examiner

*Primary Examiner* — Lin Ye
*Assistant Examiner* — Chriss Yoder, III
(74) *Attorney, Agent, or Firm* — Fitzpatrick, Cella, Harper & Scinto

(57) ABSTRACT

When a chart is used as a subject, whether or not the chart can be captured for storage is determined based on the result obtained through distance measurement at a plurality of locations in a field captured for temporary display on a viewfinder. For example, a maximum difference of distances ΔL is calculated. It is determined that the chart cannot be captured for storage if ΔL is greater than a depth of field or is greater than a predetermined TL. A message indicating that the chart cannot be captured for storage is provided. Furthermore, it is determined that the subject is not the chart to be captured for storage if a subject size does not fall within a predetermined range.

6 Claims, 5 Drawing Sheets

IMAGE SENSING APPARATUS AND METHOD FOR CONTROLLING THE SAME

BACKGROUND OF THE INVENTION

1. Field of the Invention

The present invention relates to an image sensing apparatus and a method for controlling the same.

2. Description of the Related Art

In most widely available digital cameras, a color conversion process is performed to make the colors reproduced by captured image data optimal for the user, by, for example, making the colors truer to the colors of the subject, more desirable, or the like. However, the colors of the subject differ greatly depending on the light source that illuminates the subject. Accordingly, applying a color conversion process that has been set such that the optimal color reproduction is obtained under a predetermined light source to image data captured under a different light source does not always result in optimal colors being obtained.

In order to address this, in digital cameras, white balance adjustment is performed as a pre-processing for the color conversion process. However, color information, such as R, G, B, that is output by the sensor of a digital camera does not always correspond to the tristimulus values perceived by humans. This is due to the fact that the spectral sensitivities of the R, G, B pixels of the digital camera do not match the color matching function. If the spectral sensitivities match the color matching function, with an appropriate white balance adjustment, optimal color reproduction can be obtained through a single optimal color conversion process, regardless of the light sources. In actuality, however, the spectral sensitivities do not match the color matching function, and therefore it is necessary to perform a different color reproduction depending on the light source so as to achieve a more accurate color conversion process.

In order to perform a different color reproduction depending on the light source, it is necessary to prepare a color profile such as a look-up table for the respective light sources. A known method for producing such a color profile is disclosed in Japanese Patent Laid-Open No. 2004-153684, in which a prepared chart containing a plurality of color patches is captured and a color profile is produced based on the data of the captured color patches.

In the conventional method for producing a color profile, the color patches must be captured accurately. If the color patches are not accurately captured, for example, problems as described below occur, degrading the accuracy of the produced color profile or making the production itself impossible.

- A chart is captured obliquely, making the extraction of color patch data difficult.
- The angle of view is not appropriately set when capturing, and the resultant is affected by light falloff at edges of the lens or aberration.
- A significant amount of noise appears in the data due to underexposure.
- Data of surrounding colors other than the patches is included in the patch data due to inaccurate focusing (out of focus).
- The chart is not appropriately illuminated, and the influence of non-uniform lighting occurs.
- When captured against backlight or the like, lens flare or ghosting occurs.

Usually, a color profile is produced on a personal computer (PC), and it is rarely produced at the location where the chart is captured. Thus, the case often occurs that image capturing failure is not noticed while capturing the chart, but is noticed when producing the color profile. If such a case occurs, it is necessary to return to the capturing location to capture the chart again. Particularly when the subject and chart were captured outdoors, it is almost impossible to restore the same capturing environment at a later time. If the capturing of the chart has failed and is impossible, it becomes impossible to produce an optimal color profile for the captured image of the subject. Moreover, it is not easy for a user without experience in capturing charts to accurately capture a chart.

SUMMARY OF THE INVENTION

The present invention allows realization of appropriate capturing of a chart for use in production of a color profile.

According to one aspect of the present invention, there is provided an image sensing apparatus comprising: a viewfinder display unit configured to display a chart having a plurality of patches of different colors on a viewfinder, when the chart is captured for temporary display on the viewfinder and; a distance measurement unit configured to measure distances to a plurality of locations in a field captured for temporary display on the viewfinder; a determining unit configured to determine whether or not the chart can be captured for storage, based on the distances measured by the distance measurement unit; an image sensing unit configured to capture and store the chart in a memory when it has been determined by the determining unit that the chart can be captured for storage; and a notification unit configured to provide a message indicating that the chart cannot be captured for storage when it has been determined by the determining unit that the chart cannot be captured for storage.

According to another aspect of the present invention, there is provided an image sensing apparatus comprising: a viewfinder display unit configured to display a chart having a plurality of patches of different colors on a viewfinder when the chart is captured for temporary display on the view finder; an obtaining unit configured to obtain the size of a subject which is captured for temporary display on the view finder based on an image displayed on the viewfinder; a determining unit configured to determine whether or not the subject is the chart to be captured for storage, based on the obtained size of the subject; an image sensing unit configured to capture and store the chart in a memory when it has been determined by the determining unit that the subject is the chart to be captured for storage; and a notification unit configured to notify that the chart cannot be captured for storage when it has been determined by the determining unit that the chart cannot be captured for storage.

According to still another aspect of the present invention, there is provided a method for controlling an image sensing apparatus that obtains a color patch signal for producing a color profile by capturing a chart having a plurality of color patches of different colors, the method comprising: displaying the chart having a plurality of patches of different colors on a viewfinder, when the chart is captured for temporary display on the view finder; measuring the distance to a plurality of locations in a field captured for temporary display on the viewfinder; determining whether or not the chart can be captured for storage, based on the distance measured in the measuring step; capturing the chart for storage if it has been determined that the chart can be captured for storage; and notifying that the chart cannot be captured for storage if it has been determined that the chart cannot be captured for storage.

Further features of the present invention will be apparent from the following description of exemplary embodiments with reference to the attached drawings.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

<Apparatus Configuration>

Figure 1:
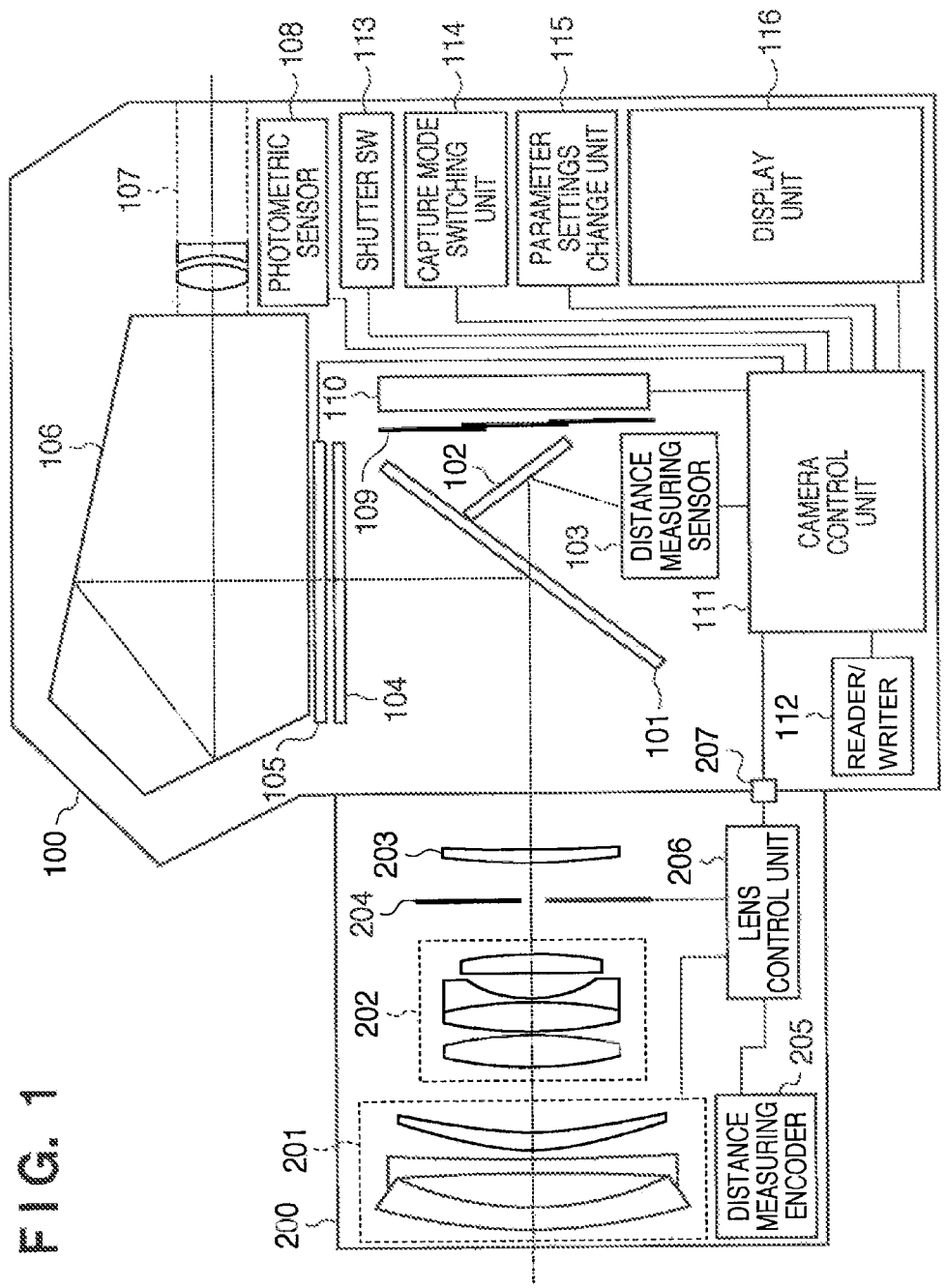
FIG. 1 is a block diagram illustrating the configuration of a digital single-lens reflex camera according to an embodiment of the present invention.

As an embodiment of the present invention, an example shall be described in which a digital single-lens reflex camera is used as an image sensing apparatus with which a chart including a plurality of color patches is captured to obtain a color patch signal for use in production of a color profile. FIG. 1 is a block diagram illustrating the configuration of a digital single-lens reflex camera according to the present embodiment. In FIG. 1, reference numeral 100 denotes a camera body, and 200 denotes an interchangeable lens unit.

The configuration of the lens unit 200 shall be described first. Reference numerals 201 to 203 denote lens elements. Reference numeral 201 denotes a focusing lens group for adjusting the point of focus in the capture screen by moving back and forth along the optical axis. Reference numeral 202 denotes a zoom lens group for changing the focal length of the lens unit 200 by moving back and forth along the optical axis to change the magnification power of the image in the capture screen. Reference numeral 203 denotes a fixed lens for improving the lens performance such as telecentricity. Reference numeral 204 denotes a diaphragm. Reference numeral 205 denotes an encoder, which reads the position of the focusing lens group 201 and outputs a signal corresponding to the distance to the subject. Reference numeral 206 denotes a lens control unit, which changes the aperture diameter of the diaphragm 204 based on the signal sent from the camera body 100 and controls the focusing lens group 201 to move based on the signal sent from the encoder 205. The lens control unit 206 also transmits, to the camera body 100, lens information including the distance to the subject determined by the encoder 205, the focal length determined based on the position information of the zoom lens group 202, the F number determined based on the aperture diameter of the diaphragm 204, etc. Reference numeral 207 denotes a lens mount contact group serving as a communication interface between the lens unit 200 and the camera body 100.

Figure 4:
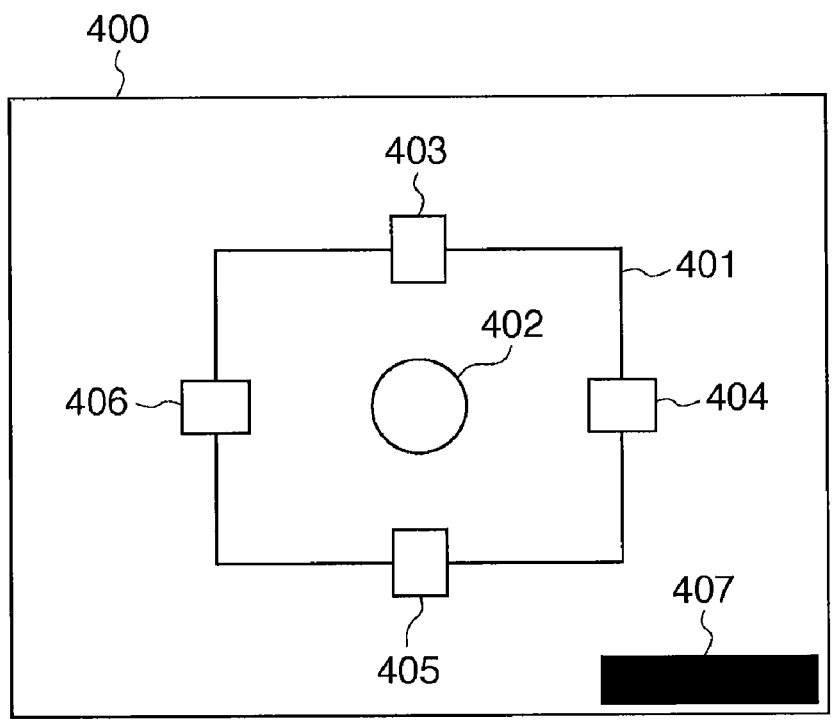
FIG. 4 is a diagram illustrating an example of a display by a viewfinder display element of the embodiment of the present invention.

The configuration of the camera body 100 shall be described next. Reference numeral 101 denotes a primary mirror, which is inclined within the photographic light path when viewing through the viewfinder, and moves aside during capturing. The primary mirror 101 is a half-silvered mirror, and as such, it permits approximately half of the light beam from the subject to pass through to a sensor 103 when it is inclined within the photographic light path. Reference numeral 104 denotes a viewfinder screen disposed on the image forming plane of the lens elements 201 to 203. The photographer can check the capture screen by viewing the viewfinder screen 104 through an eyepiece 107. Reference numeral 106 denotes a pentaprism, which changes the light path to guide the light beam from the viewfinder screen 104 to the eye piece 107. Reference numeral 105 denotes a viewfinder display element that is configured with a transmissive liquid crystal element, and displays, for example, a frame as shown in FIG. 4 and photographic information including shutter speed, aperture value, exposure correction amount, etc. on the screen that is viewed by the photographer through the eye piece 107.

Reference numeral 103 denotes a sensor, which receives a light beam from the lens unit 200, via a sub-mirror 102 that is disposed on the rear side of the primary mirror 101 to be capable of moving aside. The sensor 103 sends the condition of the received light beam to a camera control unit 111. The camera control unit 111 determines the focus conditions for the subject of the lens unit 200 based on the received condition of the light beam. Subsequently, the camera control unit 111 calculates the direction and amount in which the focusing lens group 201 is to move based on the determined focusing condition and the position information of the focusing lens group that has been sent from the lens control unit 206.

Reference numeral 108 denotes a photometric sensor, which outputs brightness and luminance signals of a predetermined region on the screen displayed in the viewfinder screen 104 and transmits them to the camera control unit 111. The camera control unit 111 determines an appropriate exposure amount for an imaging sensor 110 based on the signal value transmitted from the photometric sensor 108, that is, the result of the photometry.

The camera control unit 111 further controls the shutter speed of a shutter 109 and the aperture diameter of the diaphragm 204 to provide the determined appropriate exposure amount according to the capture mode selected by the capture mode switching unit 114. Here, the appropriate exposure amount is, for example, stored in the camera control unit 111 in advance as an output value of the imaging sensor 110 when a gray subject having a reflectivity of 18% is captured. When the capture mode is a shutter speed priority mode, the camera control unit 111 calculates the aperture diameter of the diaphragm 204 to obtain the above-determined appropriate exposure amount for the shutter speed set by a parameter settings change unit 115. Based on the calculated value, the camera control unit 111 sends a command to the lens control unit 206, thereby adjusting the aperture diameter of the diaphragm 204. Similarly, when the capture mode is an aperture priority mode, the camera control unit 111 calculates a shutter time to obtain the above-determined appropriate exposure amount for the set aperture value. Furthermore, when the capture mode is a program mode, the camera control unit 111 determines a shutter speed and an aperture value in accordance with a combination of shutter speed and aperture value that have been set in advance for the above-determined appropriate exposure amount.

The foregoing process starts when a shutter switch 13 is pressed halfway. At this time, the lens control unit 206 continues to drive the focusing lens group 201 until the position information indicated by the encoder 205 matches a target moving amount, or in other words, the moving direction and moving amount of the focusing lens group 201 that were determined by the camera control unit 111.

Next, when the shutter switch 113 is pressed fully, a capture sequence starts. Upon start of the capture sequence, the primary mirror 101 and the sub-mirror 102 are first folded and move outside the optical path. Subsequently, the lens control unit 206 closes the diaphragm 204 according to the value calculated by the camera control unit 111. Then, the shutter 109 opens or closes according to the shutter speed calculated by the camera control unit 111. After that, the diaphragm 204 is open, and the primary mirror 101 and the sub-mirror 102 return to the original position.

Reference numeral 110 denotes an imaging sensor, which transfers the luminance signal of each pixel stored while the shutter 109 is open to the camera control unit 111. In the imaging sensor 110, color filters of three colors (R, G, B) are arranged in a Bayer pattern. The camera control unit 111 forms color image signals of three channels (R, G, B) from the luminance signals corresponding to the position of the R, G and B filters. Subsequently, when in the normal capture mode, a color conversion is performed with a color profile that is pre-stored in the camera control unit 111, the colors are mapped into an appropriate color space, and an image file in an appropriate format is created. The color profile used here is a color profile created, for example, on an external PC based on a plurality of color patch signals of a chart captured in the present embodiment. When in the chart capture mode, a file in an appropriate format is created without performing a color conversion with a color profile and without mapping into color spaces.

Reference numeral 116 denotes a display unit provided on the rear side of the camera 100, which displays settings status based on the settings provided by the capture mode switching unit 114 and the parameter settings change unit 115, and also displays thumbnail images created by the camera control unit 111 after capturing.

Reference numeral 112 denotes a reader/writer for a removable memory card, which records the image file created by the camera control unit 111 after capturing into a memory card that has been attached to the recording/reproducing unit.

Figure 2A:
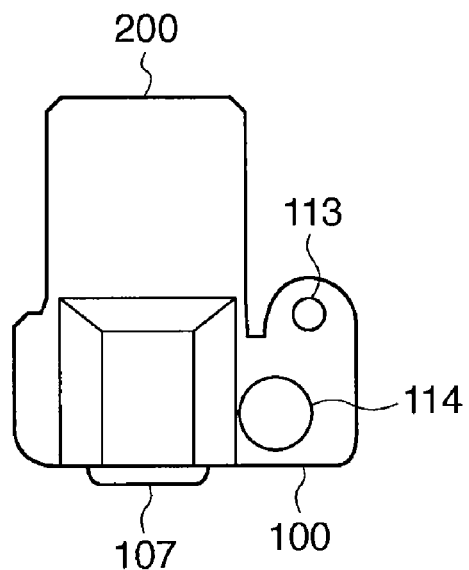
FIG. 2A is a top view of the digital single-lens reflex camera of the embodiment of the present invention.
Figure 2B:
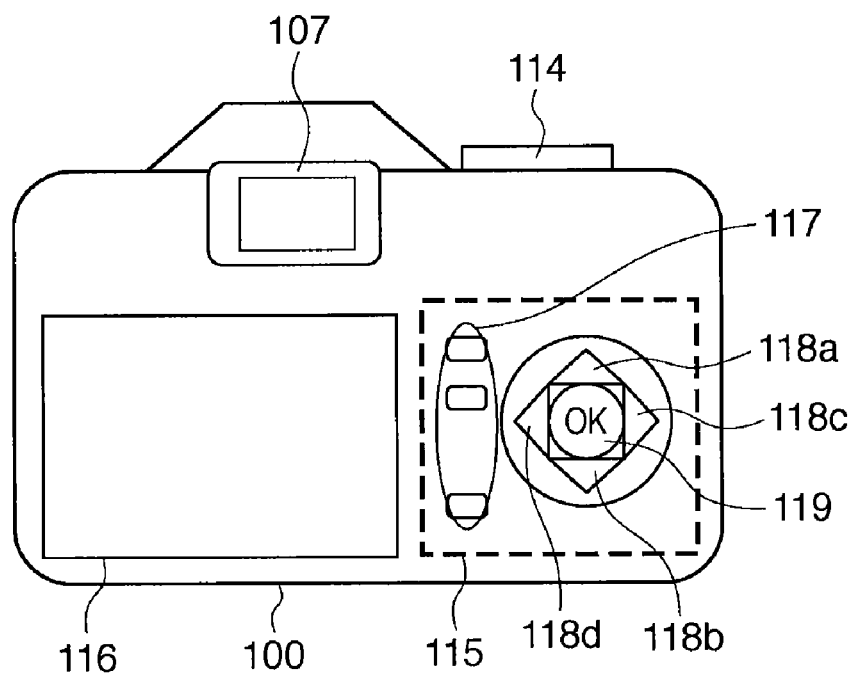
FIG. 2B is a rear view of the digital single-lens reflex camera of the embodiment of the present invention.

FIGS. 2A and 2B are a top view and a rear view of the digital single-lens reflex camera of the present embodiment. In FIGS. 2A and 2B, elements that are the same as those of FIG. 1 described above are assigned the same reference numerals. That is, reference numeral 107 is a viewfinder eye piece, 113 is a shutter switch, 114 is a capture mode switching unit, 115 is a parameter settings change unit, and 116 is a display unit.

The parameter settings change unit 115 has a switch button 117 for changing the content displayed on the display unit 116. It also has select buttons 118a (upward), 118b (downward), 118c (rightward) and 118d (leftward) for moving a selection in the up, down, right and left directions on the display unit 116. It further has an OK button 119 for verifying a selection.

Figure 3:
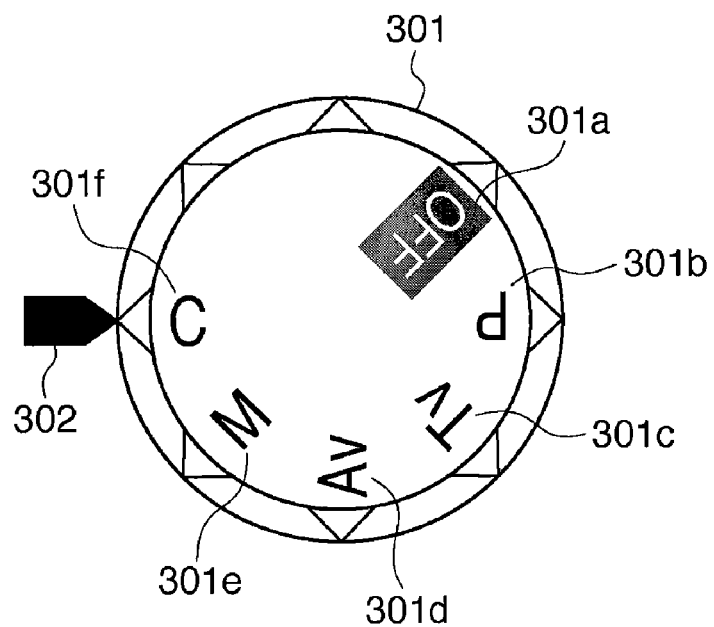
FIG. 3 is an external view of a capture mode switching unit 114 of the embodiment of the present invention.

FIG. 3 is an external view illustrating the details of the capture mode switching unit 114. In FIG. 3, reference numeral 301 denotes a mode setting dial, and 302 denotes a setting indicator of the mode setting dial 301. On the mode setting dial 301, reference numeral 301a denotes a position for turning off the camera, 301b denotes a position for setting a program mode, 301c denotes a position for setting a shutter priority mode, 301d denotes a position for setting an aperture priority mode. These capture modes have already been described in detail above. Reference numeral 301e denotes a position for setting a manual mode in which the photographer can freely set the shutter speed and the aperture. Reference numeral 301f denotes a position for setting a chart capture mode.

<Display within Viewfinder>

FIG. 4 is a diagram illustrating a viewfinder display displayed by the viewfinder display element 105. In FIG. 4, reference numeral 400 represents a viewfinder field. In the viewfinder field 400, reference numeral 401 represents a chart capture frame displayed as an indicator for the chart position when the chart capture mode is selected. The user can determine the angle of view such that a chart to be captured matches the chart capture frame 401 when in the chart capture mode. The magnification power for capturing a chart preferably is set to, but not limited to, a level that accounts for about one fourth of the area of the viewfinder field, in order to avoid the influence of light falloff at edges of the lens. Reference numeral 402 represents a photometric region. In the chart capture mode, an appropriate exposure amount for the imaging sensor 110 for capturing a chart is determined by performing spot photometry in the photometric region 402.

Reference numerals 403 to 406 are autofocus indicators of the present embodiment that are laid over the chart capture frame 401. In the present embodiment, whether a chart is placed in an appropriate position is determined by calculating the difference in the distance to the subject in each indicator based on the difference in the defocus amount in the autofocus indicators 403 to 406. Reference numeral 407 denotes a result display unit for displaying the result of whether or not the chart can be captured appropriately when in the chart capture mode. In the present embodiment, if it is determined that the chart can be captured appropriately, "OK" is displayed on the result display unit 407. If it is determined that the chart cannot be captured appropriately, "NG (No Good)" is displayed. Of course, the display of the determined result is not limited to the above, and the display can be carried out in any manner as long as the user can see the result.

<Chart Capturing Process>

Figure 5:
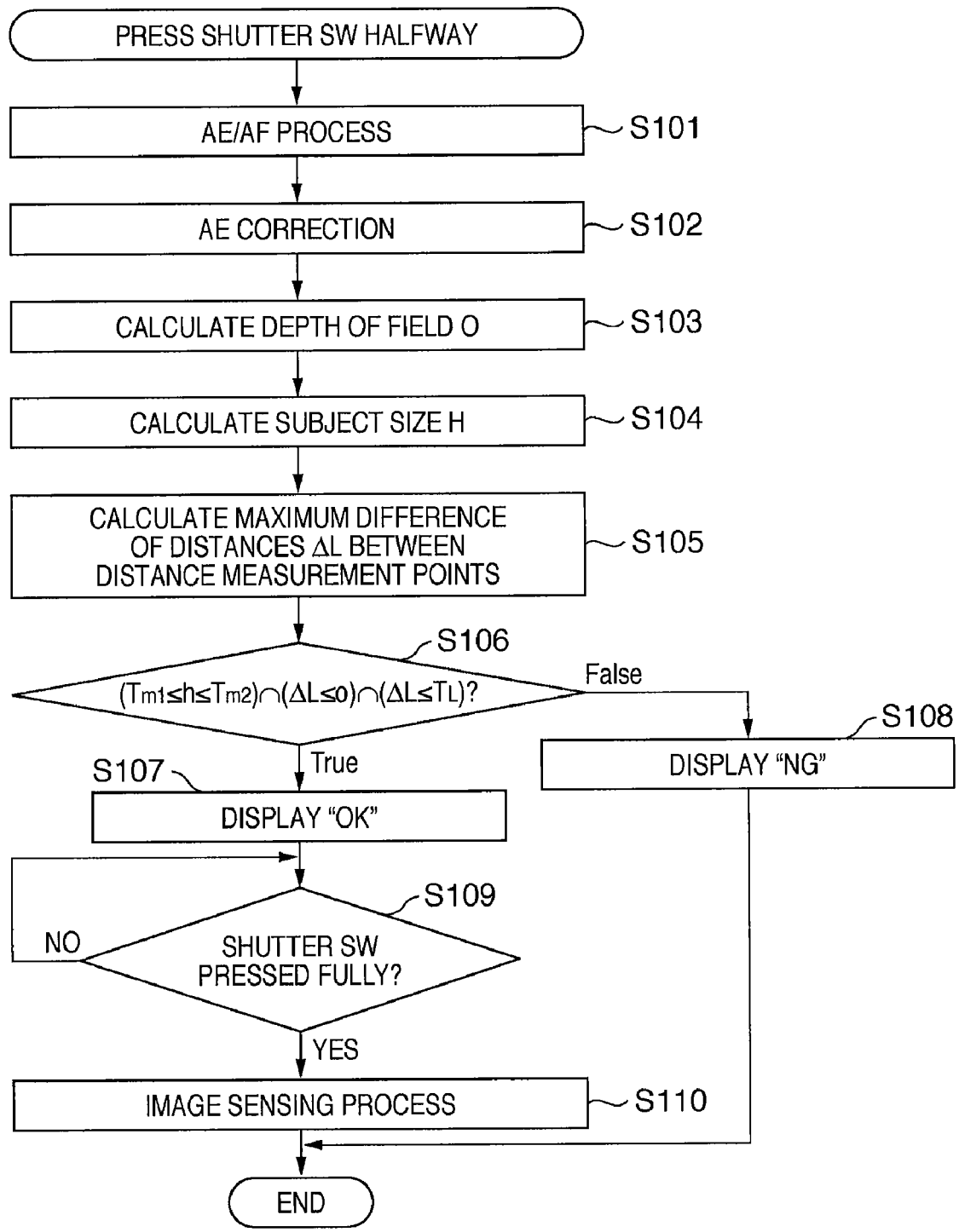
FIG. 5 is a flowchart of an image sensing process performed in a chart capture mode according to the embodiment of the present invention.

FIG. 5 is a flowchart of an image sensing process in the chart capture mode that is performed by the camera control unit 111. In a state in which the mode setting dial 301 is set to the chart capture mode position 301f, this algorithm starts when the user presses the shutter switch 113 halfway.

First, in step S101, a process for determining the exposure (AE process) and an autofocus process (AF process) are performed. In the exposure determining process, for example, similar to the aperture priority mode already described above, a shutter time at which the aforementioned appropriate exposure amount is obtained relative to the preset aperture value. Specifically, on the assumption that the average luminance in the photometric region 402 shown in FIG. 4 measured by the photometric sensor 108 is equal to that of the subject having a reflectivity of 18%, the shutter time is determined such that the output value of the imaging sensor 110 will be equal to a preset value. In the autofocus process performed in step S101, as already mentioned during the explanations of the sensor 103, the focusing lens group 201 is driven such that any one of the autofocus indicators 403 to 406 will be in focus.

Next, in step S102, the shutter time determined in step S101 is corrected according to the chart type to be captured. Specifically, in the case of a chart in which the patches located in the vicinity of the photometric region 402 have an average reflectivity higher than 18%, a change is made to make the chart brighter (to extend the shutter time). Conversely, in the case of a chart in which the patches located in the vicinity of the photometric region 402 have an average reflectivity lower than 18%, a change is made to make the chart darker (to shorten the shutter time). These correction amounts are stored in the camera control unit 111 in advance according to the chart type to be captured. The method for specifying a chart type can be, for example, selected or instructed by the user when capturing. By appropriately adjusting the exposure according to the chart type as described above, it is possible to obtain a more appropriate chart image. That is, it is possible to improve the accuracy of a color profile that is produced using information of a plurality of color patches in a chart image.

In step S103, the distance d to the subject determined by the encoder 205, the focal length f determined based on the position information of the zoom lens group 202, and the F number determined based on the aperture diameter of the diaphragm 204 are obtained from the lens control unit 206, and a depth of field o is calculated based on the above information. The depth of field o can be calculated using, for example, using the following equations (1) to (3), but the calculations are not limited thereto.

$$o = 2\sigma F m^2 \quad (1)$$

$$m = 1 - \frac{t}{2} + \frac{1}{2}\sqrt{t(t-4)} \quad (2)$$

$$t = d/f \quad (3)$$

In equation (1), σ represents the diameter of a permissible circle of confusion, which corresponds to the size of one pixel of the imaging sensor 110.

In step S104, a subject size h is calculated. As used herein, the subject size h means the size of a chart to be captured. The subject size h will be referred to in a determining step S106 performed later. When the subject size h is different from a predetermined chart size, it is determined that the subject is not a chart.

The subject size h can be calculated by, for example, the following equation, where the length on the imaging sensor 110 corresponding to the length of a side of the chart capture frame 401 shown in FIG. 4 is set to k.

$$h = |k/m| \quad (4)$$

In step S105, the maximum difference of distances ΔL of the autofocus indicators 403 to 406 (hereinafter simply referred to as "indicators") shown in FIG. 4 is calculated. In this step, first, the distance to the subject in the position of the indicators 403 to 406 is estimated from the output values of the sensor 103 corresponding to the positions of the indicators 403 to 406. Next, the difference between the maximum value and the minimum value in the distances to the subject is calculated, and this is designated as ΔL.

Step S106 is a capture determining step. This step determines the acceptance or rejection of capturing by determining whether or not the subject is a chart, or whether or not the position of the chart is appropriate based on the aforementioned maximum difference of distances ΔL, depth of field o, subject size h and distance d to the subject. Specifically, if the subject size h is larger than a predetermined threshold value Tm1 and smaller than a predetermined threshold value Tm2, because the size of the subject is different from a predetermined chart, it is determined that the subject is not a chart, and the flag is set to FALSE. If the maximum difference of distances ΔL is greater than the depth of field o, because an image in which the entire chart is in focus cannot be obtained, the flag is set to FALSE. Furthermore, if the maximum difference of distances ΔL is greater than a predetermined threshold value TL, because it is assumed that the chart that is the subject is deviated from the position of the chart capture frame 401, the flag is set to FALSE.

If the flag is set to FALSE, the processing advances to step S108, where "NG", a message indicating that the chart cannot be captured is provided to the user, is displayed on the result display unit 407, and the processing ends. If, on the other hand, the flag is set to TRUE in the determining step S106, "OK" is displayed on the result display unit 407, a message indicating that the chart can be captured is provided to the user, and the processing advances to step S110 to perform an image sensing process.

The image sensing process step S110 is executed when it is determined in step S109 that the shutter switch 113 has been pressed fully. In the image sensing process step S110, as already described, the imaging sensor 110 is exposed to light based on the exposure amount determined in steps S101 and S102, and the resulting image data is recorded in a recording medium in the reader/writer 112.

Figure 6A:
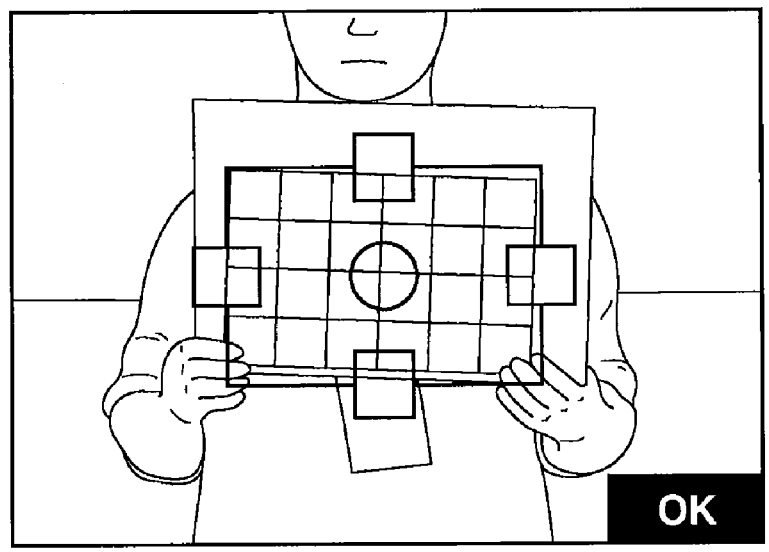
FIGS. 6A and 6B are diagrams illustrating an example of a viewfinder display according to the embodiment of the present invention.
Figure 6B:
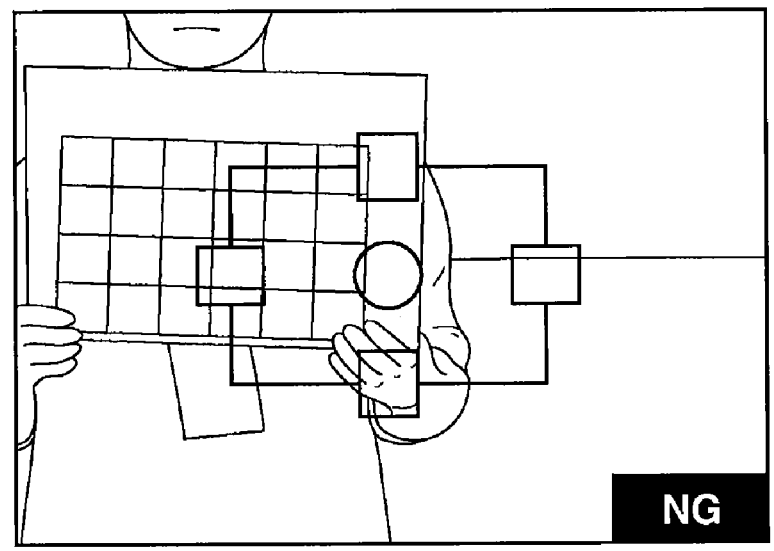

FIG. 6A is a diagram illustrating an example of a viewfinder display when it is determined that a chart can be captured appropriately in the chart capture mode. Likewise, FIG. 6B is a diagram illustrating an example of a viewfinder display when it is determined that a chart cannot be captured appropriately. When the chart as a subject is deviated from the chart capture frame 401 as shown in FIG. 6B, because it is predicted that the sensor output values in the autofocus indicators 403 to 406 are high, the maximum difference of distances ΔL becomes greater than a predetermined threshold value TL. Accordingly, it is determined that chart capturing is inappropriate, "NG" is displayed, and the processing ends.

According to the present embodiment, whether or not chart capturing can be performed appropriately is determined before performing chart capturing intended to produce a color profile, the determination result is displayed, and if it is determined that the chart cannot be captured, the capturing is prohibited. Specifically, the positional deviation of a chart is prevented with a determination made based on the distances to a plurality of indicators within the capturing range. It is also possible to appropriately set the focus when capturing by determining the aperture value according to the distance.

In addition, by correcting the exposure amount for the photometric value according to the chart type, chart capturing with an appropriate exposure amount can be performed. Through this, it is possible to always perform chart capturing with the correct chart position, the correct focus and the correct angle of view, making it easy even for a user without experience in capturing charts to perform appropriate capturing. As a result, the improvement in accuracy of a color profile produced using information regarding captured chart image can be expected.

Other Embodiments

The embodiment given above was described using a lens-interchangeable digital single-lens reflex camera as an example. However, the type of camera is not limited thereto, and it is also possible to use, for example, a fixed lens compact digital camera or digital video camera. Likewise, the embodiment given above was described using a transmissive liquid crystal element as a viewfinder display element as an example, but the present invention can also be implemented by a method in which a chart frame is displayed by lighting the viewfinder screen with a light-emitting diode. Furthermore, the present invention can also be carried out with another viewfinder configuration or display unit configuration such as, for example, a viewfinder image, a chart frame, and a chart selection screen being displayed on a liquid crystal display element or electroluminescent element, without providing the optical viewfinder.

In addition, the embodiment given above was described in the context in which an exposure is also determined in the chart capture mode as in the aperture priority mode, but the present embodiment is not limited thereto. For example, similar to the shutter speed priority mode, program mode, manual mode, etc., an exposure may be determined in the chart capture mode. The apparatus can also be configured such that the user can select the exposure determining method and the exposure correction amount. When an appropriate correction is added to the chart as in step S102 of FIG. 5, however, the amount predetermined for the mode is corrected. In the case of the shutter speed priority mode, for example, aperture value is corrected. In the case of the program mode, aperture value and shutter time are corrected. In the case of the manual mode, shutter time is corrected.

Furthermore, in the embodiment given above, whether or not chart capturing can be performed appropriately is determined by calculating a maximum difference of distances ΔL, a depth of field o, a subject size h, and a distance d to the subject, but methods for calculating these parameters are not limited to those described above, and the parameters may be calculated by any methods as long as a similar determination result can be obtained. In addition, not all of these values have to be used to make a determination, and it is possible to make a determination using an amount corresponding to at least one of these. Also, the determination criteria are not limited to those presented as an example in the determining step S106.

The present invention can also be achieved in embodiments such as a system, an apparatus, a method, a program, a recording medium (storage medium), etc. Specifically, the present invention may be applied to a system configured of a plurality of devices (e.g., a host computer, an interface device, an image sensing apparatus, a web application, etc.) or to an apparatus configured of a single device.

The present invention is also achieved by directly or remotely supplying a software program that realizes the function of the aforementioned embodiment to a system or apparatus and loading and executing the supplied program code through a computer in the system or apparatus. In this case, the program is a computer-readable program corresponding to the flowchart shown in the drawing in the embodiment.

Accordingly, the program code itself that is installed in a computer to realize the functional process of the present invention also realizes the present invention. In other words, the present invention encompasses the computer program itself for realizing the functional process of the present invention.

In this case, it may be in the form of a program executed through subject code, an interpreter, script data supplied to an OS, or the like as long as it has the functions of the program.

Examples of the recording medium that can be used to supply the program include Floppy® disks, hard disks, optical disks, magneto-optical disks, MOs, CD-ROMs, CD-Rs, CD-RWs, magnetic tape, non-volatile memory cards, ROMs, and DVDs (DVD-ROMs, DVD-Rs).

The following method can be given as another method for supplying the program. Specifically, a browser of a client computer is used to connect to an Internet website, and the computer program of the present invention itself (or a compressed file including a function for automatic installation) is downloaded from that website to a recording medium such as a hard disk. Furthermore, it is also possible to supply the program by dividing the program code that constitutes the program of the present invention into a plurality of files and downloading each file from different websites. In other words, a WWW server that allows a plurality of users to download the program files for realizing the functional processing of the present invention through a computer also falls within the scope of the present invention.

Furthermore, it is also possible to encrypt the program of the present invention, store it in a storage medium such as a CD-ROM, distribute to users, and allow a user that has satisfied predetermined conditions to download key information for decryption from a website through the Internet. That is, the user can execute the encrypted program using the key information, and install the program on a computer.

Also, the functions of the embodiment described above are realized by a computer executing a program that has been read out. Furthermore, an OS or the like running on a computer may carry out a part or all of the actual processing based on the instructions of the program so that the functions of the above-described embodiment can be achieved by that processing.

Furthermore, the functions of the above-described embodiment are realized by writing a program loaded from the recording medium into a memory provided in a function expansion board installed in a computer or in a function expansion unit connected to the computer, and then executing it. That is, a CPU or the like included in the function expansion board or the function expansion unit performs part or all of the actual processing based on the instructions of the program.

According to the image sensing apparatus of the present invention that is configured as described above, it is possible to easily perform appropriate chart capturing intended to produce a color profile.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-298589 filed on Nov. 16, 2007 and No. 2008-280278 filed on Oct. 30, 2008, which are hereby incorporated by reference herein in their entirety.

What is claimed is:

1. An image sensing apparatus comprising:
a viewfinder display unit configured to display a subject in a field, when the subject is captured for temporary display;
a distance measurement unit configured to measure a plurality of distances of the subject corresponding to a plurality of locations in the field of the viewfinder display unit:
an obtaining unit configured to obtain a size of the subject in the field;
a determining unit configured to determine whether or not the subject can be captured as a chart having a plurality of color patches which enable to generate a color profile, based on a maximum difference calculated from the plurality of distances measured by the distance measurement unit and the size of the subject obtained by the obtaining unit;
an image sensing unit configured to capture the subject as the chart in a memory when the determining unit has determined that the subject can be captured as the chart; and a notification unit configured to provide a message indicating that the subject cannot be captured as the chart when the determining unit has determined that the subject cannot be captured as the chart.

2. The image sensing apparatus according to claim 1, wherein the viewfinder display unit is configured to display a chart capture frame in the field for guiding the subject to a capturing position so as to capture the subject as the chart, and the distance measurement unit is configured to measure the plurality of distances of the subject corresponding to the plurality of the locations on the chart capture frame in the field.

3. The image sensing apparatus according to claim 1, wherein the determining unit is configured to determine that the subject cannot be captured as the chart if the calculated maximum difference of distances is greater than a predetermined threshold value.

4. The image sensing apparatus according to claim 1, further comprising an acquisition unit configured to acquire a depth of field, wherein the determining unit determines that the subject cannot be captured as the chart if the maximum difference of distances is greater than the acquired depth of field.

5. A method for controlling an image sensing apparatus, comprising:

displaying a subject in a field of a viewfinder, when the subject is captured for temporary display;

measuring a plurality of distances of the subject corresponding to a plurality of locations in the field;

obtaining a size of the subject in the field;

determining whether or not the subject can be captured as a chart having a plurality of color patches which enable to generate a color profile, based on a maximum difference calculated from the plurality of distances measured in the measuring step and the size of the subject obtained in the obtaining step;

capturing the subject as the chart when determined in the determining step that the subject can be captured as the chart; and notifying that the subject cannot be captured as the chart when determined in the determining step that the subject cannot be captured as the chart.

6. A non-transitory computer readable recording medium storing a computer program, which when executed by the computer, causes an image sensing apparatus to perform the steps of:

displaying a subject in a field of a viewfinder, when the subject is captured for temporary display;

measuring a plurality of distances of the subject corresponding to a plurality of locations in the field;

obtaining a size of the subject in the field;

determining whether or not the subject can be captured as a chart having a plurality of color patches which enable to generate a color profile, based on a maximum difference calculated from the plurality of distances measured in the measuring step and the size of the subject obtained in the obtaining step;

capturing the subject as the chart when determined in the determining step that the subject can be captured as the chart; and notifying that the subject cannot be captured as the chart when determined in the determining step that the subject cannot be captured as the chart.

* * * * *